(No Model.) 4 Sheets—Sheet 2.
J. W. HUSSEY.
APPARATUS FOR MAKING WEDGES.
No. 573,466. Patented Dec. 22, 1896.
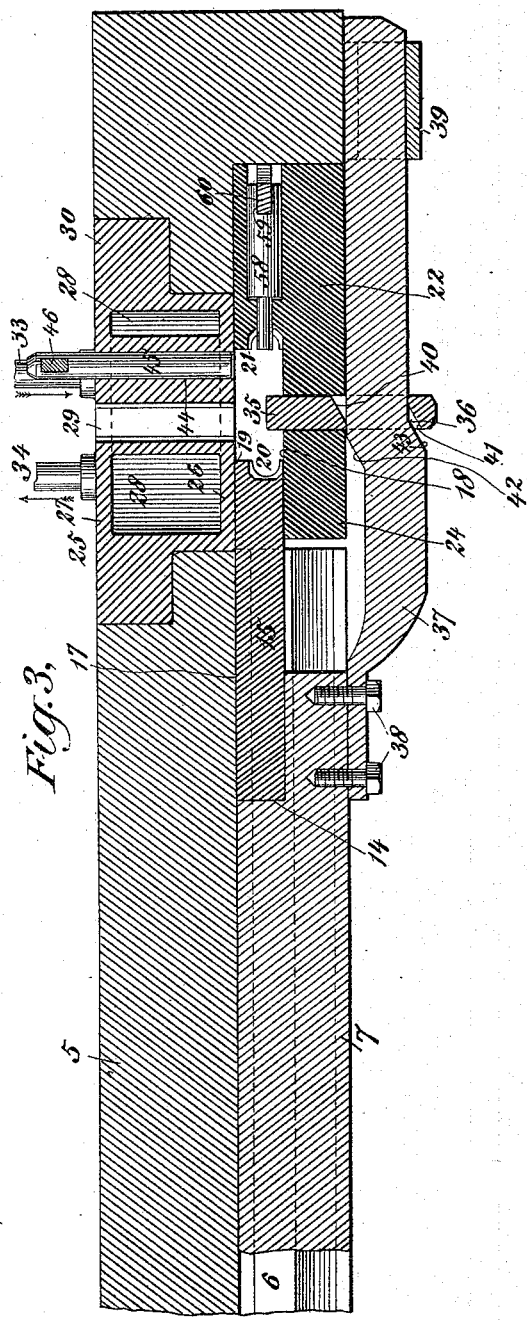
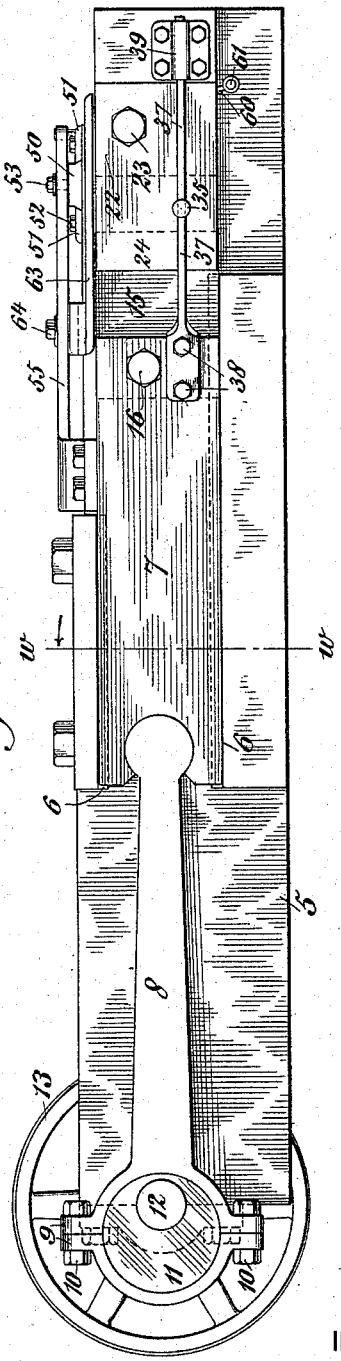
WITNESSES:
D. H. Haywood
A. V. Donovan
INVENTOR
John W. Hussey
BY
Jacob Felbel.
ATTORNEY (No Model.) 4 Sheets—Sheet 3.
J. W. HUSSEY.
APPARATUS FOR MAKING WEDGES.
No. 573,466. Patented Dec. 22, 1896.
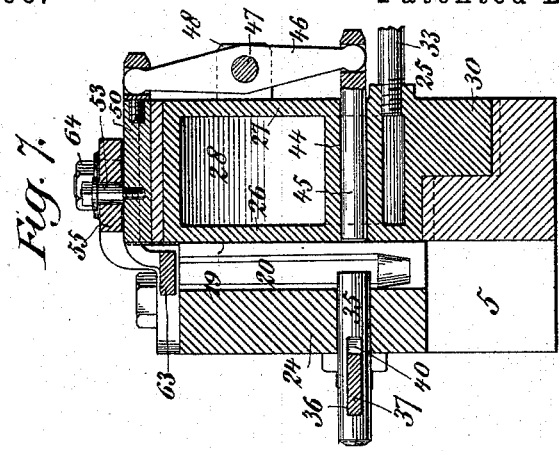
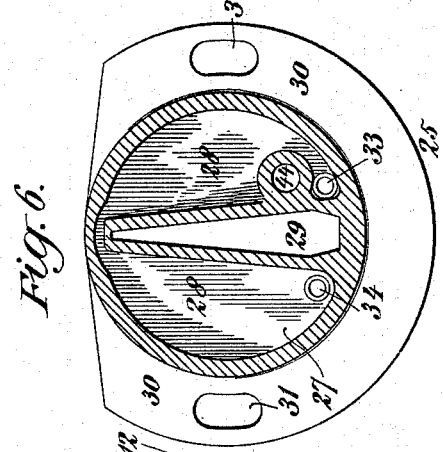
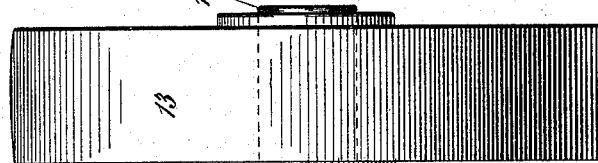
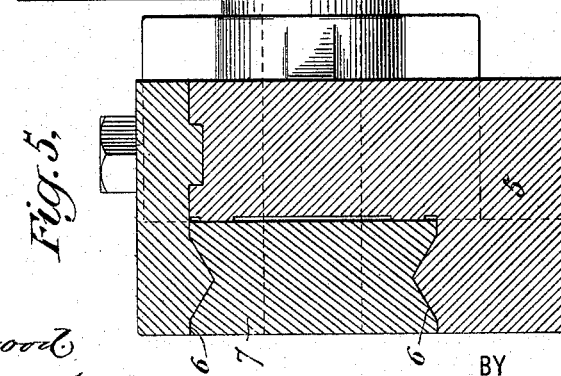
WITNESSES:
D. H. Haywood
K. V. Donovan
INVENTOR
John W. Hussey
BY
Jacob Felbel
ATTORNEY (No Model.)
J. W. HUSSEY.
APPARATUS FOR MAKING WEDGES.
No. 573,466.　　　　　　　　　　Patented Dec. 22, 1896.
4 Sheets—Sheet 4.
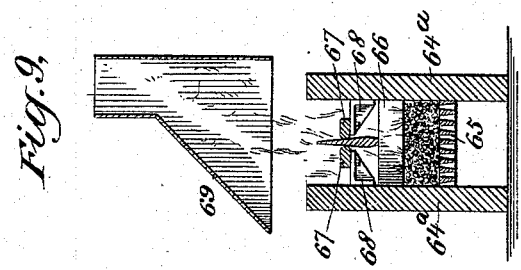
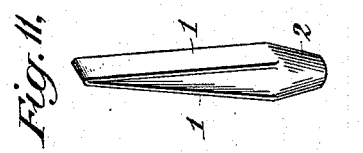
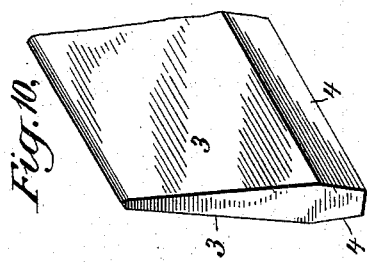
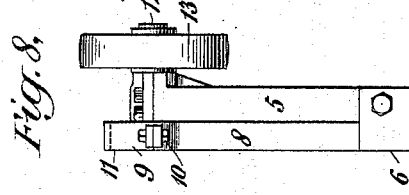
WITNESSES:
INVENTOR
John W. Hussey
BY
Jacob Felbel
ATTORNEY

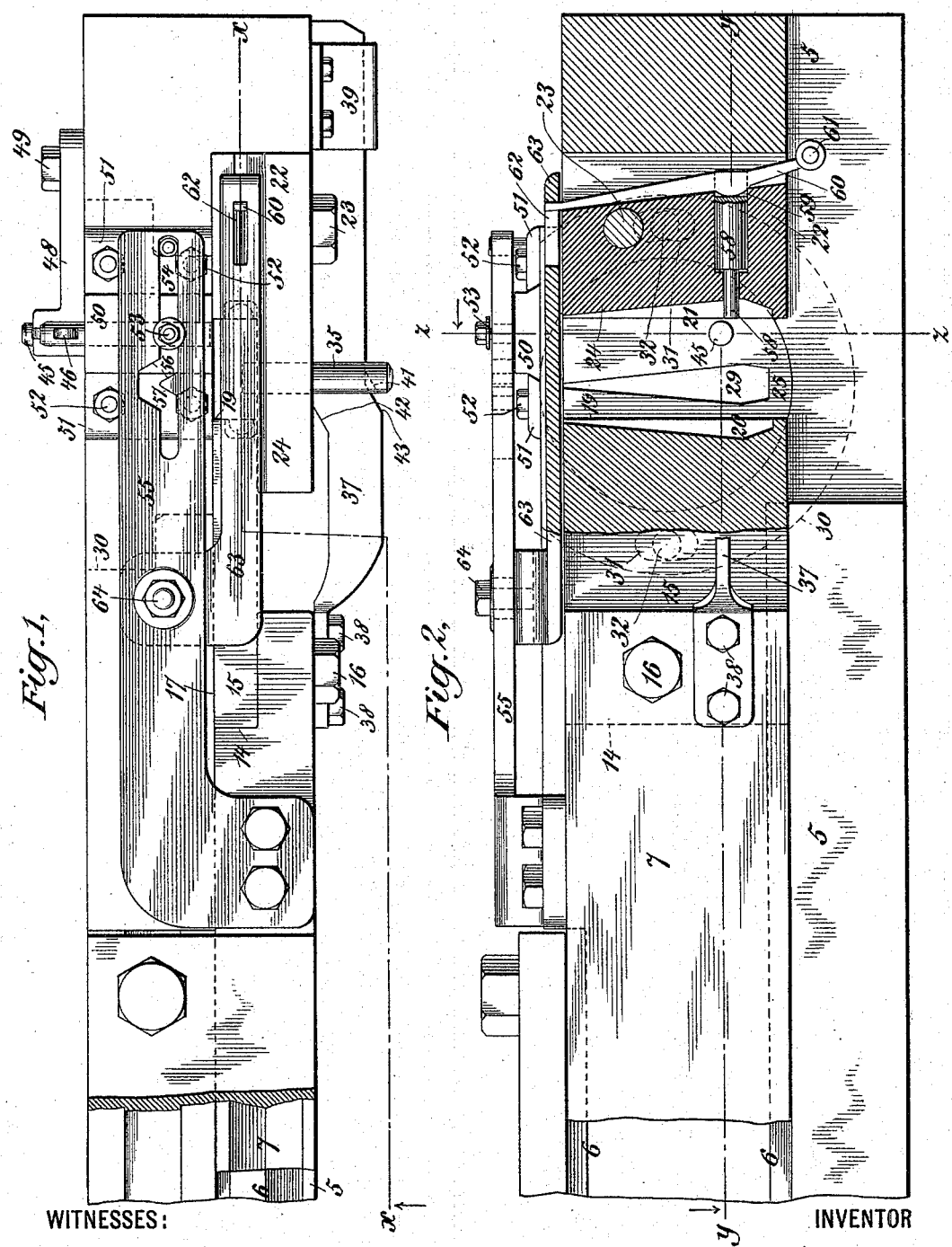

UNITED STATES PATENT OFFICE.

JOHN W. HUSSEY, OF BROOKLYN, NEW YORK, ASSIGNOR OF ONE-HALF TO CLARENCE W. SEAMANS, OF SAME PLACE.

APPARATUS FOR MAKING WEDGES.

SPECIFICATION forming part of Letters Patent No. 573,466, dated December 22, 1896.

Application filed April 1, 1895. Serial No. 544,038. (No model.)

*To all whom it may concern:*

Be it known that I, JOHN W. HUSSEY, a citizen of the United States, and a resident of Brooklyn, in the county of Kings and State of New York, have invented certain new and useful Apparatus for Making Wedges, &c., of which the following is a specification.

My invention relates more particularly to apparatus for the manufacture of wedges employed in connection with devices known as "half-rounds" in the quarrying of stone, whereby slabs or slices are cut off or removed from the body of the rock. In the performance of this work a number of round holes are drilled in the rock along a line and at suitable distances apart. Into each such hole is placed a pair of tapering half-rounds, and subsequently a wedge such as above referred to is driven in between the pair of half-rounds, forces them apart, and finally causes the desired slab to be separated from the body of the rock or granite. These wedges have heretofore been made by hand, and hence have been lacking in uniformity and have been costly to produce. By my present invention I am enabled to make such wedges with great rapidity and exactness as to size and shape and at a considerably-reduced cost.

My invention consists in certain features of construction and combinations of devices, as will herein more fully appear, and be particularly pointed out in the appended claims.

In the accompanying drawings, Figure 1 is a partial top view of a machine or press used in the manufacture of said wedges. Fig. 2 is a longitudinal vertical section thereof, taken at the line X X, Fig. 1. Fig. 3 is a horizontal section taken at the line Y Y of Fig. 2. Fig. 4 is a side elevation of the machine on a reduced scale. Fig. 5 is a cross-section, enlarged, taken at the line W W of Fig. 4. Fig. 6 is a vertical section of the combined shearing-die and guide-plate. Fig. 7 is a vertical section taken at the line Z Z of Fig. 2. Fig. 8 is a top plan diagrammatic view of the press or machine and a section of the furnace to show the relative arrangement of the two. Fig. 9 is a vertical cross-section of the furnace, showing also, as in Fig. 8, the blank to be heated therein prior to the successive formation of the wedges in the press. Fig. 10 is a perspective view of a section of the blank from which the wedges are made, and Fig. 11 is a like view of one of the completed wedges.

In the various views the same part will be found designated by the same numeral of reference.

The wedge produced, as will be seen in Fig. 11, consists, primarily, of two flat tapering sides 1 and a frusto-conical head 2, which form of wedge has been found in practice to be most desirable, particularly since a head thus made resists better the blows of a hammer or sledge and is not so readily flattened or spread and will therefore last for a much longer time. The blank from which the said wedge is made consists, preferably, of steel rolled to the shape shown at Fig. 10, that is to say, with flat wedge-shaped sides 3, extending for nearly its whole width to form the shank of the wedge, and with two flat reversely-inclined sides 4 to form the frusto-conical head of the wedge.

The blank may be of any desirable or suitable length, but it should be of a width substantially equal to the length of the intended wedge, say three and one-half inches. As a suitable length for the blank I mention ten feet. This blank is passed into a furnace and heated red-hot, after which it is fed forward step by step into the press or forming-machine, arranged adjacent to the furnace and at right angles thereto. The forward end of the heated blank is moved (either by hand-tools or automatically) through a guideway in a die-plate until the end abuts against a movable gage in the press, which determines the amount of metal that can be cut off at one time and which is just enough to produce a single wedge. As soon as the feed of the blank has been arrested by the gage a movable die advances and commences to cut off the stock in its path, at which time the gage is retreated to make way for the advancing die. The latter in cutting off the forward end of the blank drives it onward toward and in front of a stationary die, and by the time the cutting or shearing operation is completed and the severed portion of the blank is thus moved a holding or retaining bolt advances and presses the severed portion of the blank against a wall and holds it for an instant against dropping until the movable die commences to force the metal into the stationary die, when the said retaining-bolt recedes to itself escape from the advancing movable die.

Both the stationary and movable dies are hollowed to form each one-half of the wedge, and the movable die is so constructed as to constitute also a shearing-die when used in connection with the lateral fixed die-plate above referred to. On the completion of the wedge by the movable die and the stationary die the movable die starts to return immediately, and for the purpose of preventing the adhesion thereto of the finished wedge, and hence the carrying of the same to an undesired point, the retaining-bolt repeats its forward movement and clamps the finished wedge between itself and the wall of the machine, thereby freeing the wedge positively from the movable die. As soon as this is accomplished the retaining-bolt returns to its normal position and an ejecting-bolt starts forward in the line of the returning movable die and through a hole in the stationary die, and thereby positively expels the finished wedge from the stationary die in case it has happened that the said wedge has adhered thereto. After performing this duty the ejecting-bolt returns to its normal position, with its face in line with the face of the stationary die, and the ejected wedge drops by gravity through an opening in the body of the machine onto the floor or into a suitable receptacle placed thereupon. These actions are repeated in the making of each wedge, and the various devices referred to which cooperate in the production of the wedge, together with the means whereby their various movements are produced and with other devices used in connection with the furnace and the press, will now be described more fully in detail.

5 designates the body or framework of the press, which may be mounted upon or formed integral with any suitable base or foundation. In ways or guides 6 is arranged to reciprocate a vertical slide 7, having V-shaped grooves adapted to the corresponding ways. To the rear end of said slide is pivotally attached one end of a pitman 8, the opposite end of which, by collars or straps 9 and bolts 10, is connected to a crank or eccentric 11 on a shaft 12, mounted in suitable bearings in the framework and provided with a band-pulley 13 at one end, to which the motive power may be applied. The forward end of the slide is notched, as indicated at 14, to receive the rear end of the movable die 15, which may be secured by any suitable means, but which is preferably connected to the slide by a screw-bolt 16, passing transversely through the slide and entering a tapped hole in the body of the die, which is guided in its movements by the walls 17 and 18 and also by the combined guide and die plate to be presently referred to.

The forward or working end of the movable die is provided with a cutting or shearing edge 19 and with a vertical groove or recess 20, corresponding in shape to one half of the wedge to be produced, as will be seen more particularly by reference to Figs. 2 and 3.

The working face 21 of the fixed or stationary die 22 is likewise formed with a vertical hollow or recess corresponding with that in the movable die and with the other half of the wedge to be produced, as will likewise be seen by reference to Figs. 2 and 3. The stationary die is preferably secured to the framework or body of the machine by a screw-bolt 23 and is preferably provided with a longitudinal extension 24 and by which guide 18 is furnished.

The combined shearing-die and guide-plate is designated in its entirety by the numeral 25, and comprises the inner plate 26, the outer plate 27, the intermediate cold-water passage 28, the central vertical guideway 29 for the blank, and a circular attaching-flange 30, provided with segmental slots 31, by which the device as a whole may be attached to the side of the press by screws or bolts 32, and in a manner such that the device may be adjusted relatively to the movable die and may be conveniently detached for the substitution of other die and guide plates to make other forms or sizes of wedges, &c.

On one side of the guide-opening 29 is attached a supply-pipe 33, leading into said cold-water chamber 28, and on the opposite side of said guide-opening is a return or exit pipe 34 also connected with said water-chamber. These pipes connect with any suitable source of supply, and during the operation of the machine a circulation of cold water is kept up in and through the water-chamber for the purpose of keeping the die-plate and forming-dies cool and thereby obviate overheating of the parts and loss of temper in the dies, which are made of hardened steel.

35 designates the gage, which is cylindrical in form and works in a hole or bearing in the extension 24 of the fixed die. This gage is provided with a transverse horizontal slot 36, through which passes a flat bar 37, attached at one end by screws 38 to the slide 7 and supported at its free end in a bearing 39, bolted to the framework. The inner wall 40 of the slot 36 is beveled, and the outer wall 41 thereof is also beveled, as shown more particularly at Fig. 3, and at said view it will also be observed that the sliding bar 37 is formed at its inner edge with a beveled surface or cam 42 and at its outer edge with another like cam 43, the cam 42 being adapted to act in conjunction with the beveled wall 40 and the cam 43 with the beveled wall 41 for the purpose of reciprocating said gage 35. In the advancing movement of the slide 7 cam 43 acts to retreat the gage, while in the returning movement cam 42 acts to advance the gage or move it into the space between the forming-dies. The gage is arranged substantially in line with the guide-opening 29 in the die-plate.

On that side of said guide-opening nearest the face of the fixed die is formed in the die-plate a horizontal bearing 44, in which reciprocates a horizontal retaining bolt or pin 45, to the outer end of which is pivotally connected the lower end of a vertically-arranged lever 46, fulcrumed on a pin 47 on an arm or bracket 48, secured by a bolt 49 to the framework. The upper end of said lever is pivotally connected to the outer end of a transversely-arranged shifting plate 50, which moves between guide-bars or gibs 51, attached by screws or bolts 52 to the top of the press. Screwed into said plate 50 and projecting vertically up therefrom is a stud 53, which occupies a slot 54, running lengthwise on an arm or bracket 55, bolted to the top of the slide 7, as shown more particularly at Figs. 1, 2, and 7. The said stud may be provided with a washer or head to overlap the edges of the slot. The said slot is formed with two pairs of inclined faces 56 and 57, oppositely arranged and forming two cams, that numbered 56 for the purpose of moving the shifting plate 50 outwardly and that numbered 57 for moving it inwardly. When the shifting plate moves outwardly, the retaining-bolt 45, through the lever connection described, is moved inwardly, and vice versa. These cams 56 and 57 are arranged contiguous to each other and act one almost instantly after the action of the other, whereby the retaining-bolt is retreated almost immediately after it has been advanced. The longitudinal portions of the slot 54 on the sides of the cams enable the shifting plate 50 to remain at rest during certain portions of the stroke of the slide 7 and the arm or bracket 55.

At near the lower end of the stationary die is formed a horizontal opening of two diameters, in which is arranged to slide an ejecting-pin 58, which is preferably smaller at its operating end. The rear end of said pin or bolt is slotted at 59 for the passage therethrough of a vertically-arranged lever 60, fulcrumed at 61 at its lower end, and which at its upper end enters a slot 62 in an arm or slide 63, attached by a bolt 64 to the arm 55, all as clearly shown at Fig. 2, where the slide 7, the arms 55 and 63, as well as the reciprocating forming-die, are shown at the extremes of their rearward movement, and at which time it will be observed that the ejecting-pin protrudes through the working face of the stationary die. On the return movement of the arm 63 the inner wall of the slot 62 operates to vibrate the lever 60 and move the ejecting-pin back, so that its face comes flush with the face of the stationary die by or before the time the severed portion of the blank is crowded into said die; and from this view it will also be observed that before the arm 63 reaches the end of its return movement the outer wall of the slot 62 vibrates the lever 60 in the opposite direction and forces the pin 58 inwardly to dislodge the finished wedge.

As will be seen by reference to Fig. 8, the furnace is arranged adjacent to the side of the press, but is disconnected therefrom in practice in order to avoid the liability of unduly heating the press. The furnace consists principally of brick or other fireproof walls $64^a$, of a length substantially equal to the length of one of the rolled-steel blanks to be heated and of any suitable height. 65 designates the grate of the furnace, and above the same, extending from wall to wall, is a series of horizontal cross-bars 66, adapted to support the blank, as illustrated at Fig. 9, the blank being shown therein in section and as supported laterally or guided by a pair of longitudinally-arranged bars 67, attached to angular brackets 68, projecting inwardly from either wall. The coal is preferably piled up to the bottom edge of the cross-bars, and the flame, smoke, &c., are carried up to a flue or chimney by an overhanging hood 69.

The space between the guide-bars 67, through which the blank is moved, is arranged in alinement with the guide-opening 29 in the die-plate, so that the forward ends of the blanks may pass directly into said guide-opening from the furnace, the guide-opening being made in cross-section or contour to match that of the blank.

In the operation of the apparatus the blank is passed endwise into the furnace, and after becoming sufficiently heated is fed forward through the guide-opening 29 until its leading end strikes the inner end of the gage-pin 35, which at this moment is projected inwardly, as shown at Fig. 3, the movable die, the retaining pin or clamp, and the ejecting-pin likewise being at this moment in the positions shown at Fig. 3.

As the movable die advances its shearing edge 19, operating in connection with the inner edge of the guide-opening 29 or with the edge of the die-plate 26 thereat, begins to cut off the previously-measured amount of stock from the blank, which has been determined by the gage, as aforesaid, and at this moment the gage is retreated to permit of the advancement of the die 15. When the end of the blank has been cut off, it is carried by the rapidly-moving die in front of the fixed die and also in front of the laterally-arranged retaining-bolt, which at this moment is shot inward to hold the severed portion of the blank against the wall 18, but only for an instant and until the moving die can commence to crowd or press about half of the metal into the stationary die and force itself round the remaining portion of the metal and cause the stock to fill the hollows of both dies and under the pressure partake accurately of the forms or shapes thereof. Upon the completion of the forging operation the movable die at once recedes, and at the moment it starts to part company with the fixed die the retaining-pin again moves forward to press the finished wedge against the wall 18, so that in case it has adhered to the moving die it is prevented from returning with said die. During the back stroke of the moving die the ejecting-pin 58 is moved inwardly, as before explained, after the retraction of the retaining-bolt, and in case the finished wedge has adhered to the fixed die said pin will operate to expel the same and enable it to fall by gravity out of the machine.

While the above-described apparatus has been designed more particularly for the manufacture of wedges, it may, with changes of dies and other slight modifications of details, be employed in the manufacture of other articles or devices, and I therefore do not wish to be restricted altogether to the manufacture of wedges or to such devices from blanks of the form shown.

Various changes in construction and arrangement may be made without departing from the spirit of my invention.

What I claim as new, and desire to secure by Letters Patent, is—

1. The combination with the forming-dies, one of which is movable and provided with a shearing edge, a lateral die-plate having a guide-opening, and a retreating gage arranged opposite said opening in the path of said movable die, and means for moving said gage; substantially as described.

2. The combination with the forming-dies, one of which is movable and provided with a shearing edge, a lateral die-plate provided with a guide-opening, a gage-pin opposite said opening and having a transverse slot with beveled walls, and a reciprocating cam-bar acting upon said walls; substantially as described.

3. The combination with the forming-dies, one of which is movable and provided with a shearing edge, a lateral die-plate having a guide-opening, a retreating gage opposite thereto, and means for temporarily clamping or holding the severed portion of the blank just prior to the forging or pressing operation; substantially as described.

4. The combination with the forming-dies, one of which is movable and provided with a shearing edge, a lateral die-plate having a guide-opening, and a reciprocating retaining pin or bolt; substantially as described.

5. The combination with the forming-dies, one of which is movable and provided with a shearing edge, a lateral die-plate having a guide-opening and a retaining pin or bolt, an operating-lever therefor, a shifting plate for actuating said lever, and cams for moving said plate; substantially as described.

6. The combination with the forming-dies, one of which is movable and provided with a shearing edge, a reciprocating slide to which said movable die is attached, a lateral die-plate having a guide-opening, a movable gage opposite thereto, and standing in the path of the movable die during the feeding of the blank and a cam-bar attached to said slide for retreating said gage to permit the advance of the movable shearing-die; substantially as described.

7. The combination with the forming-dies, one of which is movable and provided with a shearing edge, a reciprocating slide to which said movable die is attached, a lateral die-plate having a guide-opening, a retaining pin or bolt, a lever for actuating same, a transversely-arranged shifting plate for vibrating said lever, and a duplex cam bar or arm for moving said shifting plate and attached to said slide; substantially as described.

8. The combination with the forming-dies, one of which is movable and provided with a shearing edge, a lateral die-plate having a guide-opening, an ejector, for expelling the finished article from the fixed die, a lever connected to said ejector, and an actuating-bar for said lever connected to the means for reciprocating the movable die; substantially as described.

9. The combination with the forming-dies, one of which is movable and provided with a shearing edge, a lateral die-plate having a guide-opening, a reciprocating gage, a reciprocating clamp or retaining-pin, and an ejector; substantially as described.

10. The combination with the forming-dies, one of which is movable and provided with a shearing edge, a lateral die-plate having a guide-opening and a cold-water chamber, means for supplying the latter, a reciprocating gage, and a reciprocating clamp or retaining-pin; substantially as described.

11. The combination of the movable forming-die having a shearing edge, the fixed die having an extension, a gage movable in said extension, a lateral die-plate having a guide-opening opposite said gage, and a reciprocating retaining-pin adapted to hold the severed portion of the blank against the wall of said extension; substantially as described.

12. The combination of a fixed die, a slide, a movable gage, a cam-bar for operating the same attached to said slide, a lateral die-plate having a guide-opening opposite said gage, a retaining-pin sliding horizontally in said die-plate, a vertically-arranged actuating-lever connected thereto, a horizontally-arranged shifting plate connected to said lever, a movable arm or bracket connected to said shifting plate and formed with a longitudinal slot and two cams for reciprocating said plate, an ejecting-pin movable in the fixed die, a lever connected thereto, and a slotted arm connected to said lever and to the said slide; substantially as described.

Signed at New York city, in the county of New York and State of New York, this 27th day of March, A. D. 1895.

JOHN W. HUSSEY.

Witnesses:
 JACOB FELBEL,
 K. V. DONOVAN.